United States Patent
Hyun et al.

(10) Patent No.: US 10,167,914 B2
(45) Date of Patent: Jan. 1, 2019

(54) ELECTROMECHANICAL BRAKE

(71) Applicant: Hyundai Motor Company, Seoul (KR)

(72) Inventors: Dong Yoon Hyun, Seoul (KR); Jong Yun Jeong, Gyeonggi-do (KR); Joung Hee Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/340,843

(22) Filed: Nov. 1, 2016

(65) Prior Publication Data

US 2017/0314627 A1 Nov. 2, 2017

(30) Foreign Application Priority Data

Apr. 29, 2016 (KR) .................. 10-2016-0052685

(51) Int. Cl.
| | |
|---|---|
| *F16D 65/18* | (2006.01) |
| *F16D 55/226* | (2006.01) |
| *F16D 121/24* | (2012.01) |
| *F16D 125/40* | (2012.01) |
| *F16D 125/58* | (2012.01) |

(52) U.S. Cl.
CPC ........... *F16D 65/18* (2013.01); *F16D 55/226* (2013.01); *F16D 2121/24* (2013.01); *F16D 2125/40* (2013.01); *F16D 2125/582* (2013.01)

(58) Field of Classification Search
CPC ...... F16D 55/226; F16D 65/18; F16D 65/567; F16D 2125/582; F16D 2125/40; F16D 2121/02; F16D 2121/24; F16D 2065/386; F16D 2127/06
USPC ...................................................... 188/72.3
See application file for complete search history.

(56) References Cited

U.S. PATENT DOCUMENTS

| | | | |
|---|---|---|---|
| 2002/0023806 A1* | 2/2002 | Ohtani | B60T 13/741 188/72.1 |
| 2002/0063022 A1* | 5/2002 | Shaw | F16D 65/18 188/72.1 |
| 2012/0145491 A1* | 6/2012 | Hyun | F16D 55/226 188/71.8 |

(Continued)

FOREIGN PATENT DOCUMENTS

| | | |
|---|---|---|
| JP | H08312701 A | 11/1996 |
| JP | 2010-505072 A | 2/2010 |

(Continued)

*Primary Examiner* — Robert A. Siconolfi
*Assistant Examiner* — San M Aung
(74) *Attorney, Agent, or Firm* — Mintz Levin Cohn Ferris Glovsky and Popeo, P.C.; Peter F. Corless (57) ABSTRACT

An electromechanical brake is capable of quickly releasing braking force and improving braking performance of a vehicle even when a power source breaks down. The electromechanical brake includes a drive unit including: a nut member which is coupled to a piston and moves in an axial direction to allow the piston to move forward and backward; a spindle which is thread-coupled to the nut member and rotates to move the nut member in the axial direction; an electric motor which provides power for rotating the spindle; a friction member which rotates together with the spindle; and an elastic member which stores elastic energy by being deformed when the friction member rotates during the braking operation, and provides elastic restoring force as backward torque to the spindle through the friction member when the braking operation is released.

13 Claims, 2 Drawing Sheets

(56) References Cited

U.S. PATENT DOCUMENTS

2014/0069751 A1* 3/2014 Park .................. F16D 65/0075
                                                        188/72.4
2015/0300433 A1* 10/2015 Yasui .................. F16D 65/18
                                                        188/162

FOREIGN PATENT DOCUMENTS

| JP | 2011-213205 A | 10/2011 |
| JP | 2013-217468 A | 10/2013 |
| KR | 2011-0125140 A | 11/2011 |
| KR | 10-1220405 B1 | 1/2013 |
| KR | 10-1562884 B1 | 10/2015 |
| WO | 2015/151618 A1 | 10/2015 |

* cited by examiner

ELECTROMECHANICAL BRAKE

CROSS-REFERENCE TO RELATED APPLICATION

This application claims under 35 U.S.C. § 119(a) the benefit of Korean Patent Application No. 10-2016-0052685 filed on Apr. 29, 2016, the entire contents of which are incorporated herein by reference.

BACKGROUND (a) Technical Field

The present invention relates to an electromechanical brake, more particularly, to an electromechanical brake capable of quickly releasing braking force and improving braking performance of a vehicle even when a power source breaks down.

(b) Description of the Related Art

In general, a brake device for a vehicle is a device that generates braking force for decelerating or stopping a moving vehicle or maintaining the vehicle in a stopped state, and the braking is carried out while kinetic energy of the vehicle is converted into thermal energy by mechanical friction when the vehicle decelerates, and frictional heat is radiated into the atmosphere.

As the brake device for a vehicle, there are a drum type hydraulic brake, a disc type hydraulic brake, and the like, and the disc type hydraulic brake obtains braking force by strongly pressing friction pads against both surfaces of a disc, which rotates together with a wheel, instead of using a drum.

However, the hydraulic brake has a complicated structure because it requires mechanical elements connected to a brake pedal in front of a driver seat, hydraulic piping, elements for controlling hydraulic pressure, and the like, and therefore, an electromechanical brake (EMB) has been developed and used to simplify a configuration of the brake device.

Unlike the typical hydraulic brake, the electromechanical brake refers to a brake that obtains braking force by pressing a friction pad by using a mechanical mechanism driven by an electric motor.

The typical electromechanical brake has an actuator including the electric motor that rotates forward and backward in order to perform the braking operation (press the friction pad) and release the braking operation (reduce pressure), and the electromechanical brake operates to press the friction pad using rotational force of the motor so that the friction pad presses the disc (causes friction with the disc) at the time of performing the braking operation.

Compared to the hydraulic brake, the electromechanical brake has a simple structure and a high response speed, and may be more precisely controlled, thereby improving braking safety.

The electromechanical brake is advantageous because braking force is easily controlled, and essentially used to implement a brake-by-wire (BBW) system.

Meanwhile, the electromechanical brake generates braking force from electric power by using the motor and a mechanical transmission mechanism as described above, and in this case, most electromechanical brakes use a principle of screws such as bolts and nuts, and convert rotational force of the motor into translational force for pressing the friction pad.

In the related art, Korean Patent No. 10-1220405 (Jan. 3, 2013) discloses an electromechanical brake in which when rotational force of a motor is transmitted via a reduction gear to an operating shaft thread-coupled to a piston, the rotational force is converted into translational force by a screw structure between the piston and the operating shaft.

In the electromechanical brake, clamping force is generated by a pressing operation of the piston, and the brake disc is pressed by the clamping force, such that braking force is generated.

However, in a case in which a power source, which supplies electric power for operating to the motor, breaks down in the electromechanical brake in the related art, braking force may not be sufficiently released after the braking force is generated, because of motor cogging torque, internal friction, or the like.

That is, torque, which allows the motor to rotate in a reverse direction, is generated due to a clamping force of a caliper housing when the power source breaks down at the time of performing the braking operation, but the torque in the reverse direction is cancelled out due to motor cogging torque, friction between gears in a decelerator, friction of the operating shaft, friction of the piston, and the like, and as a result, the braking force may not be sufficiently released. Therefore, while the vehicle is moving, differential braking may occur, and as a result, a dangerous situation such as spinning of the vehicle may be caused.

Therefore, there is a need for a technology that may prevent a wheel from being locked and quickly release braking force such that motion stability of the vehicle does not deteriorate when a power source for powering the electromechanical brake breaks down.

The above information disclosed in this Background section is only for enhancement of understanding of the background of the invention and therefore it may contain information that does not form the prior art that is already known in this country to a person of ordinary skill in the art.

SUMMARY

The present invention provides an electromechanical brake capable of quickly releasing braking force and improving braking performance of a vehicle even when a power source breaks down, as well as in a normal state of the vehicle.

In one aspect, the present invention provides an electromechanical brake which includes a pair of friction pads installed to press a disc at a time of performing a braking operation, a piston which is installed in a caliper housing so as to be movable forward and backward, and moves forward to press one of the pair of friction pads at the time of performing the braking operation, and a drive unit which provides power for moving the piston, the drive unit including: a nut member which is coupled to the piston installed in the caliper housing and moves in an axial direction to allow the piston to move forward and backward; a spindle which is thread-coupled to the nut member and rotates to move the nut member in the axial direction; an electric motor which provides power for rotating the spindle; a friction member which is rotatably installed in the caliper housing and rotates together with the spindle by frictional force when the spindle comes into contact with the friction member and causes friction; and an elastic member which is installed between the caliper housing and the friction member, stores elastic energy by being deformed when the friction member rotates during the braking operation, and provides elastic restoring force as backward torque to the spindle through the friction member when the braking operation is released.

Accordingly, the electromechanical brake according to the present invention has an advantage in that braking force may be quickly released by elastic energy stored in the elastic member even when a power source breaks down as well as in a normal state.

In particular, according to the electromechanical brake according to the present invention, braking force may be quickly released when the power source for supplying electric power to the motor breaks down, and as a result, it is possible to prevent the occurrence of differential braking and a dangerous situation such as spinning of the vehicle.

An anti-lock brake system (ABS), which prevents the wheel from being locked, may be smoothly operated because braking force may be quickly released when the ABS operates, a braking distance may be shortened because a wheel speed is not rapidly reduced, and as a result, ABS operating performance and vehicle braking performance may be improved.

Since frictional force, which is generated by a clamping operation, is used to release braking force, separate devices for coping with abrasion of the friction pad are not required, and as a result, there is an advantage in terms of costs and weights.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings so that those skilled in the art to which the present invention pertains may easily carry out the exemplary embodiments. However, the present invention is not limited to the exemplary embodiments to be described below and may be specified as other aspects.

An electromechanical brake according to an exemplary embodiment of the present invention has a configuration in which elastic energy is stored in an elastic member by frictional force as clamping force of a caliper housing is applied when a motor is operated to generate braking force, and a quick operation for releasing braking force is performed by elastic energy stored in the elastic member when the braking force is released.

Figure 1:
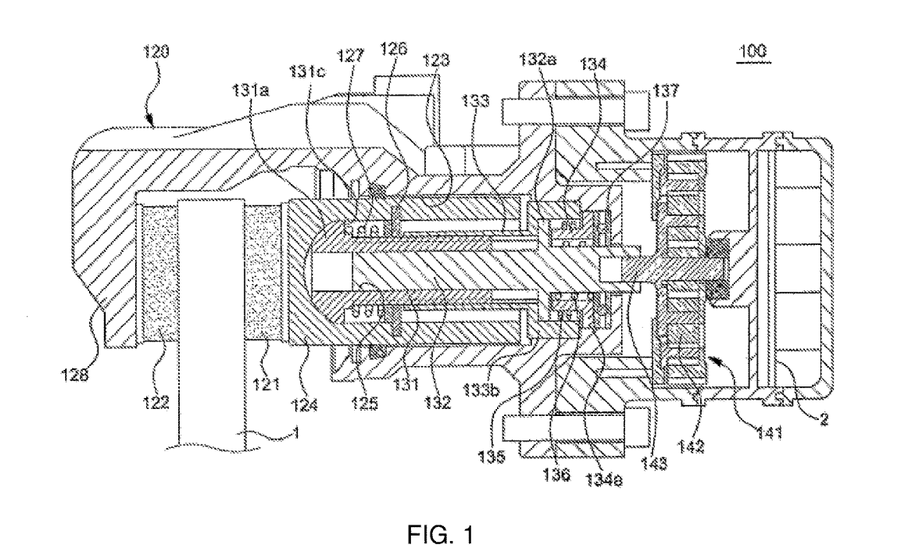
FIG. 1 is a cross-sectional view of an electromechanical brake according to an exemplary embodiment of the present invention.
Figure 2:
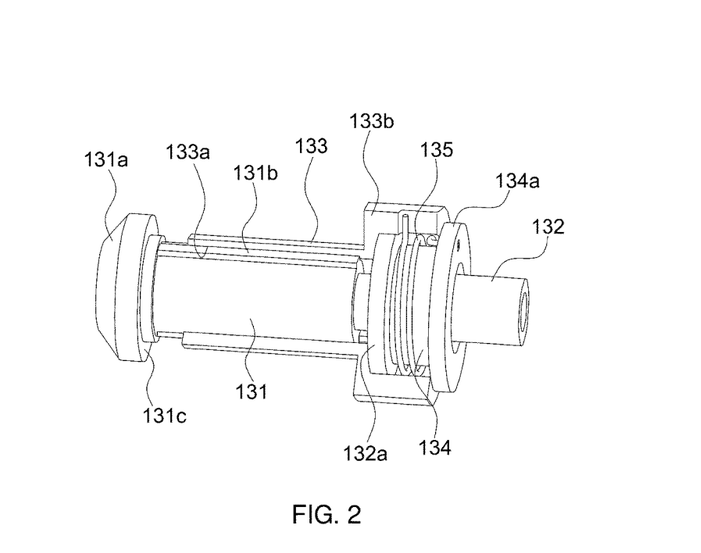
FIG. 2 is a perspective view illustrating main operating elements of the electromechanical brake according to the exemplary embodiment of the present invention.
Figure 3:
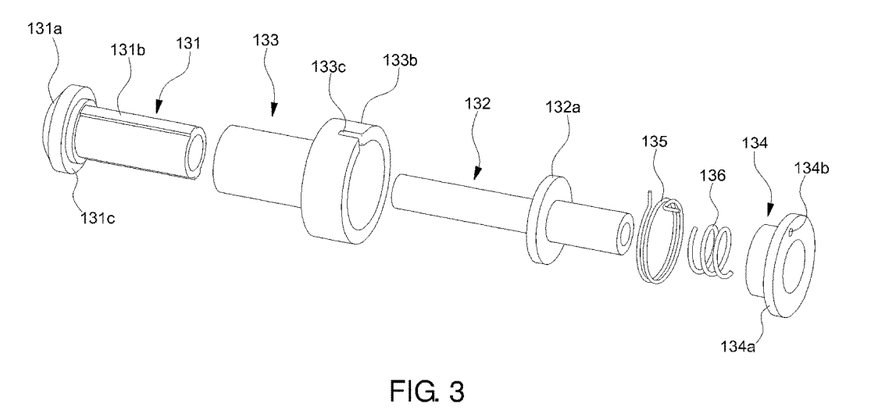
FIG. 3 is an exploded perspective view of the main operating elements shown in FIG. 2.

FIG. 1 is a cross-sectional view of an electromechanical brake according to an exemplary embodiment of the present invention, FIG. 2 is a perspective view illustrating main operating elements of the electromechanical brake according to the exemplary embodiment of the present invention, and FIG. 3 is an exploded perspective view of the main operating elements shown in FIG. 2.

As shown, an electromechanical brake 100 according to an exemplary embodiment of the present invention includes a carrier (not shown) which is fixedly installed on a vehicle body, and a caliper housing 120 which is coupled to the carrier so as to be movable forward and backward, and the carrier and the caliper housing 120 are disposed to surround one side of a disc 1 installed in a wheel of a vehicle.

In the carrier, a pair of friction pads (brake pads) 121 and 122, which presses both surfaces of the disc 1 that rotates together with the wheel of the vehicle, is installed to be movable forward and backward.

The pair of friction pads 121 and 122 is installed to be spaced apart from each other, and the disc 1 is disposed between the pair of friction pads 121 and 122. Therefore, when a piston 124 (described below) operates to move forward, the friction pad 121 moves toward the disc 1 to cause friction with the disc and press the disc, thereby performing the braking operation.

The caliper housing 120 is slidably installed on the carrier, and has a cylinder 123 in which the piston 124 is installed.

That is, the hollow cylinder 123 is formed at one side of the caliper housing 120, and the piston 124 is installed in the cylinder 123 so as to be movable forward and backward.

The piston 124 moves forward to move one friction pad 121 of the pair of friction pads 121 and 122 forward toward the disc 1, such that the friction pad 121 causes friction with the disc 1.

A finger portion 128, which moves the other friction pad 122 forward toward the disc 1 so that the friction pad 122 causes friction with the disc 1, is formed at another side of the caliper housing 120.

Therefore, the piston 124 moves forward toward the friction pad 121 and the disc 1 by force transmitted for braking and then presses the one friction pad 121 against the disc 1, and the caliper housing 120 moves in a direction opposite to the movement direction of the piston 124 by reaction force applied between the piston 124 and the one friction pad 121 such that the finger portion 128 of the caliper housing 120 presses the other friction pad 122 against the disc 1.

Therefore, the two friction pads 121 and 122 are pressed against both surfaces of the disc 1 at the same time.

In this case, the braking operation is performed by frictional force generated between the two friction pads 121 and 122 and the disc 1, and by the frictional force, braking force is generated to restrict the wheel so that the wheel cannot be rotated.

The force with which the piston 124 and the finger portion 128 of the caliper housing 120 press the friction pads 121 and 122 against both surfaces of the disc 1 may be referred to as clamping force of the caliper housing 120, and at the time of performing the braking operation (i.e., pressing the friction pads), reaction force, which is generated when the clamping force is applied, is applied to the piston 124 from the friction pad 121.

Meanwhile, the electromechanical brake 100 according to the exemplary embodiment of the present invention includes a drive unit for operating the piston 124, and the drive unit includes a nut member 131 which is coupled to the piston 124 installed in the cylinder 123 of the caliper housing 120 and moves forward and backward in an axial direction (moves straight forward and backward) so as to allow the piston 124 to move forward and backward, a spindle 132 which is thread-coupled to the nut member 131 and rotates to move the nut member 131 forward and backward (move the nut member 131 straight forward and backward), an electric motor 140 which provides rotational force for generating braking force, and a gear assembly 141 which is disposed between a rotating shaft of the electric motor 140 and the spindle 132 and transmits rotational force of the electric motor 140 to the spindle 132.

The drive unit further includes a guide member 133 which is fixedly installed in the caliper housing 120 so as to restrict the rotation of the nut member 131 and guide the nut member 131 to move forward and backward in the axial direction, a friction member 134 which is rotatably installed in the cylinder 123 of the caliper housing 120 and rotates together with the spindle 132 by frictional force when the spindle 132 comes into contact with the friction member 134 and causes friction with the friction member 134, and an elastic member 135 which is installed between the caliper housing 120 and the friction member 134 and stores elastic energy by being deformed when the friction member 134 rotates.

First, the piston 124 of the caliper housing 120 has therein a hollow portion 125 that extends and elongates in the axial direction thereof (i.e., the axial direction is identical to the forward and backward movement direction of the piston), and the nut member 131 is installed and coupled in the hollow portion 125 of the piston 124.

The nut member 131 has an elongated cylindrical shape, and has a head portion 131a which is formed at a tip portion of the nut member 131 and configured to come into contact with an inner surface of the hollow portion 125 of the piston 124 so as to press the inner surface of the hollow portion 125.

A guide protrusion 131b protrudes from an outer surface of the nut member 131 so as to elongate in a longitudinal direction thereof (i.e., the axial direction), the guide protrusion 131b of the nut member 131 is coupled to a guide groove 133a of the guide member 133 fixedly installed on an inner surface of the cylinder 123 of the caliper housing 120.

The guide member 133 has one side fixed to the caliper housing 120, and another side inserted into the hollow portion 125 of the piston 124 so as to accommodate therein the nut member 131.

The guide groove 133a of the guide member 133 is formed in an inner surface of the guide member 133 so as to elongate in the longitudinal direction (i.e., the axial direction), such that the forward and backward axial movement (forward and backward straight movement) of the nut member 131 is guided in a state in which the guide protrusion 131b is inserted into the guide groove 133a.

Since the guide member 133 is completely fixed and mounted on the inner surface of the cylinder 123 of the caliper housing 120 so that the guide member 133 cannot rotate and move forward and backward, the nut member 131, which has the guide protrusion 131b coupled to the guide groove 133a of the guide member 133, is only movable forward and backward in the axial direction inside the guide member 133, but cannot rotate because the nut member 131 is restricted by the guide member 133 in a rotation direction.

In the exemplary embodiment, a close contact spring 127 may be installed between the piston 124 and the nut member 131 in order to provide elastic restoring force for bringing the inner surface of the hollow portion 125 of the piston 124 into contact with the head portion 131a of the nut member 131 so that the head portion 131a of the nut member 131 is always maintained in contact with the inner surface of the hollow portion 125 of the piston 124.

In this case, the head portion 131a has a shape protruding in a radial direction from the tip portion of the nut member 131, and with the protruding shape, a support end 131c, which may support the close contact spring 127, is provided on the head portion 131a of the nut member 131.

A ring-shaped spring support plate 126, which is disposed in a rear of the head portion 131a of the nut member 131, is fixedly installed in the inner surface of the hollow portion 125 of the piston 124, and the close contact spring 127 is installed between the head portion 131a of the nut member 131 (in more detail, the support end 131c of the head portion 131a) and the spring support plate 126 in a state in which the nut member 131 is assembled to pass through the spring support plate 126.

The elastic restoring force of the close contact spring 127, which is compressed and interposed between the head portion 131a of the nut member 131 and the spring support plate 126, serves as force that brings the inner surface of the hollow portion 125 of the piston 124 into contact with the head portion 131a of the nut member 131.

Screw threads are processed and formed on an inner circumferential surface of the nut member 131, and screw threads, which may be thread-coupled to the nut member 131, are processed and formed on an outer circumferential surface of the spindle 132, such that the nut member 131 may move forward and backward in the axial direction when the spindle 132 rotates.

That is, the spindle 132 is thread-coupled to the interior of the nut member 131, and as a result, rotational force of the spindle 132 may be converted into forward and backward translational force of the nut member 131.

When the nut member 131 moves forward and backward in the axial direction, the nut member 131 moves straight forward and backward in the axial direction by being guided by the guide member 133.

In this configuration, the piston 124 of the caliper housing 120 is installed between the friction pad 121 and the nut member 131 and transmits translational force of the nut member 131 to the friction pad 121.

The spindle 132 is coupled to a shaft 143 of an output gear 142 of the gear assembly 141, and in this case, an inner circumferential surface of a rear end portion of the spindle 132 is spline-engaged with an outer circumferential surface of the shaft 143 of the output gear 142, and a support portion 132a, which has a shape enlarged in the radial direction, protrudes from the rear end portion of the spindle 132.

The spline engagement enables rotational force to be transmitted between the shaft 143 of the output gear 142 and the spindle 132, and enables the spindle 132 to move in the axial direction relative to the shaft 143 of the output gear 142.

Of course, the spindle 132 cannot freely move in the axial direction in the cylinder 123, and since the spindle 132 is supported by the friction member 134 in a rear of the spindle 132 through the support portion 132a, the spindle 132 merely moves to the extent that the support portion 132a of the spindle 132 is attached to and presses the friction member 134 so that frictional force is generated to rotate the friction member 134 together with the spindle 132 when the spindle 132 rotates.

In the exemplary embodiment, a support spring 136, which elastically supports the spindle 132 in the axial direction inside the caliper housing 120, may be installed between the support portion 132a of the spindle 132 and the inner surface of the cylinder 123 of the caliper housing 120, and the support spring 136 may have one end portion which supports the support portion 132a of the spindle 132 in the rear of the support portion 132a, and the other end portion which is supported on the inner surface of the cylinder 123 in a state in which a bearing member 137 is interposed therebetween.

In the structure in which the spindle 132 passes through the interior of the friction member 134, the support spring 136 is also installed to be positioned in the friction member 134.

The electric motor 140 of the drive unit is a driving source which generates driving power, that is, rotational force for performing the braking operation (pressing) and releasing the braking operation (reducing pressure), and rotates forward at the time of pressing the friction pad and backward at the time of reducing pressure on the friction pad, such that the electric motor 140 generates forward rotational force and backward rotational force and provides the forward rotational force and the backward rotational force to the spindle 132 through the gear assembly 141.

The operation of the electric motor 140 is controlled by a controller 2, and the controller 2 controls the forward and backward operations of the motor 140.

The gear assembly 141 is a constituent element that reduces a rotational speed of the motor 140, amplifies rotational force of the motor 140, and then transmits the rotational force to the spindle 132, and may be configured as a gear train including a combination of a plurality of gears.

The electric motor 140 and the gear assembly 141 may be those applied to a publicly known electromechanical brake 100, but in the gear assembly 141, the spindle 132 is coupled to the shaft 143 of the output gear 142 that finally outputs rotational force of the motor 140.

The guide member 133 is installed to be completely fixed to the inner surface of the cylinder 123 of the caliper housing 120, and has a cylindrical shape so that the nut member 131 may be guided in the axial direction in a state in which the nut member 131 is inserted into the guide member 133 as described above, and the guide member 133 is configured such that the nut member 131 and the spindle 132 coupled to the nut member 131 pass through the interior of the guide member 133.

An enlarged portion 133b, which has a cylindrical shape enlarged in a radial direction, is formed at a rear end portion of the guide member 133, and the support portion 132a of the spindle 132, the friction member 134, and the elastic member 135 are positioned inside the enlarged portion 133b.

In this case, the enlarged portion 133b of the guide member 133 is fixed to the inner surface of the cylinder of the caliper housing 120, and a front portion of the enlarged portion 133b of the guide member 133 is inserted into the hollow portion 125 of the piston 124 and then coupled to the outer surface of the nut member 131.

The friction member 134 has a ring shape, such that a rear portion of the support portion 132a of the spindle 132 passes through the interior of the friction member 134, and a rear end portion of the spindle 132 is coupled to the shaft 143 of the output gear 142 of the gear assembly 141 in a state in which the rear end portion is inserted into the friction member 134.

An enlarged portion 134a, which has a plate shape enlarged in the radial direction, is formed at the rear end portion of the friction member 134, and the elastic member 135, which stores elastic energy by being deformed when the friction member 134 rotates, is installed between the enlarged portion 134a of the friction member 134 and the enlarged portion 133b of the guide member 133.

The friction member 134 is rotatably installed inside the cylinder 123 of the caliper housing 120 and may be installed to be rotatably supported by the bearing member 137 interposed between the friction member 134 and the inner surface of the cylinder 123, and the friction member 134 is configured to rotate together with the spindle 132 by frictional force when the spindle 132 comes into contact with the friction member 134 and causes friction.

In this case, the support portion 132a of the spindle 132 comes into contact with an end surface of a front end portion of the friction member 134 and causes friction, and when reaction force, which is generated by clamping force at the time of performing the braking operation, that is, at the time of pressing the friction pad, is applied to the piston 124 from the friction pad 121, the reaction force is applied from the piston 124 through the nut member 131 to the spindle 132 in the rear of the piston 124, and in this case, the support portion 132a of the spindle 132 comes into contact with the end surface of the front end portion of the friction member 134 disposed in the rear of the spindle 132 and causes friction.

As a result, when a predetermined or higher level of friction is generated between the support portion 132a of the spindle 132 and the end surface of the front end portion of the friction member 134, the spindle 132 and the friction member 134 rotate together by the frictional force, and the elastic member 135 is deformed to have elasticity by the rotation of the friction member 134.

When a predetermined or higher level of reaction force is applied to the spindle 132 from the friction pad 121 through the piston 124 and the nut member 131 at the time of pressing the friction pad, the reaction force serves as force that pushes the spindle 132 rearward. As a result, the support portion 132a of the spindle 132 generates high frictional force at a predetermined or higher level by the reaction force in a state in which the support portion 132a of the spindle 132 is in contact with the end surface of the front end portion of the friction member 134, and in this case, the spindle 132 and the friction member 134 may rotate together by the frictional force.

The elastic member 135 may be a torsion spring that has one end portion coupled by being fitted into a hole 134b of the enlarged portion 134a of the friction member 134, and the other end portion coupled by being fitted into a hole 133c of the enlarged portion 133b of the guide member 133.

Therefore, when the spindle 132 and the friction member 134 rotate together, the elastic member 135 has elasticity by being compressed and deformed in a torsional manner, and stores elastic energy in a state of being compressed and deformed.

The configuration of the electromechanical brake according to the exemplary embodiment of the present invention has been described as described above, and an operation of the electromechanical brake will be described below.

Figure 4:
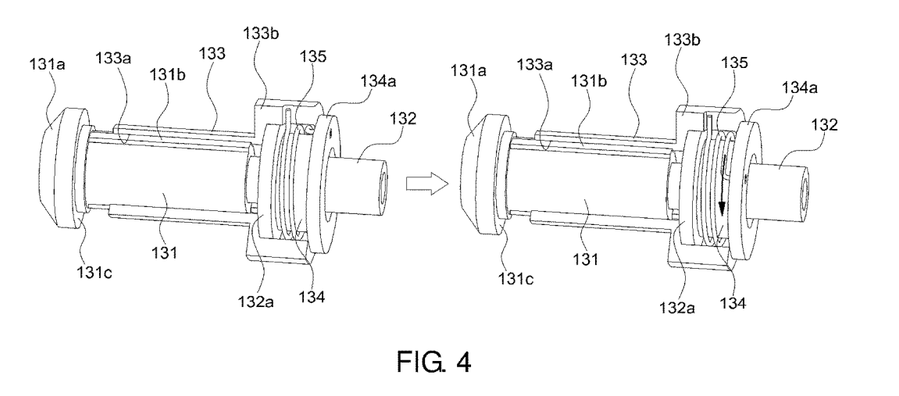
FIG. 4 is a view illustrating a state in which the main operating elements shown in FIG. 2 are operated.

FIG. 4 is a view illustrating a state in which the main operating elements illustrated in FIG. 2 are operated, and illustrates a state in which the spindle and the friction member rotate such that the elastic member (torsion spring) is deformed.

The left drawing in FIG. 4 illustrates a state in which braking force is released, and when the friction pad is pressed to generate braking force, the spindle 132 and the friction member 134 rotate together such that the elastic member (torsion spring) 135 is compressed and deformed as shown in the right drawing in FIG. 4.

First, the operation of pressing the friction pad will be described. The operation of pressing the friction pad refers to a state in which the piston 124 presses the friction pad 121 so as to generate braking force and the pair of friction pads 121 and 122 presses the disc 1.

The electric motor 140 rotates forward by being controlled by the controller 2 in order to press the friction pad, and in this case, rotational force of the motor 140 is transmitted to the spindle 132 through the gear assembly 141, and thus the spindle 132 rotates forward.

When the spindle 132 rotates forward, rotational force of the spindle 132 is converted into translational force of the nut member 131 thread-coupled to the spindle 132, and therefore, the nut member 131 moves straight in the axial direction, that is, moves forward by being guided by the guide member 133 fixedly installed inside the cylinder 123 of the caliper housing 120.

In this case, since the nut member 131 is coupled to the piston 124, the piston 124 moves toward the friction pad 121 and presses the friction pad 121 by the nut member 131 that moves forward, and the friction pad 121 presses the disc 1 which is rotating integrally with the wheel.

Of course, the pair of friction pads 121 and 122 generates braking force by pressing both surfaces of the disc 1 at the same time. In this case, the piston 124 presses the one friction pad 121 against the disc 1 while moving forward toward the friction pad 121 and the disc 1, and the caliper housing 120 moves in a direction opposite to the movement direction of the piston 124 by the reaction force applied between the piston 124 and the one friction pad 121, such that the finger portion 128 of the caliper housing 120 presses the other friction pad 122 against the disc 1.

As a result, braking force is generated by friction between the disc 1 and the friction pads 121 and 122 that press the disc 1.

Clamping force is applied when the friction pad is pressed as described above, and the reaction force is generated by the clamping force and applied to the piston 124 from the friction pad 121, and the reaction force is transmitted to the spindle 132 through the nut member 131.

As the reaction force is transmitted, the support portion 132a of the spindle 132 presses the end surface of the front end portion of the friction member 134, and therefore, a predetermined or higher level of frictional force is generated between the support portion 132a of the spindle 132 and the friction member 134.

In this state, the spindle 132 rotates by rotational force of the motor 140 so as to generate braking force. In this case, the friction member 134 and the spindle 132 rotate together by frictional force generated between the friction member 134 and the support portion 132a of the spindle 132, and the elastic member (torsion spring) 135, which is installed between the friction member 134 and the guide member of the caliper housing 120, is compressed and deformed by the rotation of the friction member 134 and stores elastic energy (see the right drawing in FIG. 4).

Next, at the time of reducing pressure on the friction pad when the braking force is released (pressing is released), the electric motor 140 rotates backward by being controlled by the controller 2, and rotational force of the motor 140 is transmitted to the spindle 132 through the gear assembly 141, such that the spindle 132 rotates backward.

When the spindle 132 rotates backward, rotational force of the spindle 132 is converted into translational force of the nut member 131 thread-coupled to the spindle 132, and thus the nut member 131 moves backward in the axial direction by being guided by the guide member 133.

In this case, when the piston 124 moves straight opposite to the friction pad 121 and reduces pressure on the friction pad by the nut member 131 that moves backward, frictional force and braking force between the disc 1 and the friction pads 121 and 122 are reduced.

The friction is maintained between the support portion 132a of the spindle 132 and the friction member 134 after pressure on the friction pad begins to be reduced as described above, and as the spindle 132 rotates backward, the friction member 134 also rotates backward by frictional force between the support portion 132a of the spindle 132 and the friction member 134.

When the friction member 134 rotates backward as described above, the elastic member 135, which has been compressed when the elastic member 135 is pressed, is elastically restored, and the elastic restoring force is applied to the spindle 132 and provided as torque in the backward direction, and when the backward torque is applied to the spindle 132, braking force may be quickly released.

Next, an operation when a power source breaks down will be described. During the braking operation (an operation of pressing the friction pad), when a power source for the electromechanical brake 100 breaks down in a state in which the spindle 132 and the friction member 134 rotate together by friction and the elastic member 135 is somewhat compressed and deformed, the elastic member 135, which has been compressed when the elastic member 135 is pressed, provides backward torque to the spindle 132, similar to when the pressure on the friction pad is reduced.

With the aforementioned operations, the spindle 132 rotates backward, such that braking force may be released.

Next, in a case in which the friction pad 121 is pressed in a state in which the friction pad 121 is somewhat abraded, a vertical force between the support portion 132a of the spindle 132 and the friction member 134 is low while the nut member 131 further moves forward as much as the amount of abrasion of the friction pad 121, and as a result, the elastic member (torsion spring) 135 is not compressed.

Clamping force is generated after the piston 124 comes into contact with the friction pad 121, and frictional force between the support portion 132a of the spindle 132 and the friction member 134 is increased by the reaction force.

The spindle 132 and the friction member 134 rotate together by the frictional force, and the elastic member 135 stores elastic energy by being compressed, and as a result, the configuration of the exemplary embodiment may cope with the abrasion of the friction pad.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An electromechanical brake which includes a pair of friction pads installed to press a disc at a time of performing a braking operation, a piston which is installed in a caliper housing so as to be movable forward and backward, and moves forward to press one of the pair of friction pads at the time of performing the braking operation, and a drive unit which provides power for moving the piston, the drive unit comprising:
   a nut member which is coupled to the piston installed in the caliper housing and moves in an axial direction to allow the piston to move forward and backward;
   a spindle which is thread-coupled to the nut member and rotates to move the nut member in the axial direction;
   an electric motor which provides power for rotating the spindle;
   a friction member which is rotatably installed in the caliper housing and rotates together with the spindle by frictional force when the spindle comes into contact with the friction member and causes friction; and
   an elastic member which is installed between the caliper housing and the friction member, stores elastic energy by being deformed when the friction member rotates during the braking operation, and provides elastic restoring force as backward torque to the spindle through the friction member when the braking operation is released,
   wherein a support portion having a shape enlarged in a radical direction protrudes from the spindle, the friction member is formed in a ring shape such that a portion of the spindle in a rear of the support portion is coupled to pass through an interior of the friction member, and the support portion of the spindle presses the friction member so as to generate the friction force, and
   wherein the elastic member is a torsion spring installed between the caliper housing and the friction member.

2. The electromechanical brake of claim 1, wherein the friction member is disposed in a rear of the spindle in the caliper housing, such that when reaction force in response to clamping force, which presses the disc at the time of performing the braking operation, is transmitted to the spindle through the friction pad, the piston, and the nut member in front of the spindle, the spindle presses the friction member in the rear of the spindle so as to generate the frictional force.

3. The electromechanical brake of claim 1, wherein an enlarged portion enlarged in the radial direction is formed at a rear end portion of the friction member, and the torsion spring is installed between the caliper housing and the enlarged portion of the friction member.

4. The electromechanical brake of claim 1, wherein a support spring, which elastically supports the support portion of the spindle in the axial direction in the rear of the support portion of the spindle, is installed between the support portion of the spindle and the caliper housing.

5. The electromechanical brake of claim 2, wherein the spindle is spline-engaged with an output gear shaft of a gear assembly for transmitting rotational force of the electric motor so that the spindle moves in the axial direction.

6. The electromechanical brake of claim 1, wherein the piston has a hollow portion formed in the axial direction, the nut member is installed by being inserted into the hollow portion of the piston, and a head portion, which presses an inner surface of the hollow portion of the piston, is formed at a tip portion of the nut member.

7. The electromechanical brake of claim 6, wherein a close contact spring, which brings the inner surface of the hollow portion of the piston into contact with the head portion of the nut member, is installed between the piston and the nut member so that the head portion of the nut member is always maintained in contact with the inner surface of the hollow portion of the piston.

8. The electromechanical brake of claim 7, wherein a ring-shaped spring support plate, which is disposed in a rear of the head portion of the nut member, is fixedly installed in the inner surface of the hollow portion of the piston, the nut member is coupled to pass through an interior of the spring support plate, and the head portion is formed in a shape that protrudes in the radial direction at the tip portion of the nut member, and the close contact spring is installed between the head portion and the spring support plate.

9. The electromechanical brake of claim 1, wherein a guide member, which restricts the rotation of the nut member and guides the nut member to move forward and backward in the axial direction, is fixedly installed in the caliper housing.

10. The electromechanical brake of claim 9, wherein the guide member is formed in a cylindrical shape, and has one side which is fixed to the caliper housing, and another side inserted into a hollow portion of the piston and coupled to accommodate the nut member therein.

11. The electromechanical brake of claim 9, wherein a guide protrusion is formed on the nut member so as to elongate in the axial direction, a guide groove is formed in the guide member so as to elongate in the axial direction, and the guide member guides the axial movement of the nut member in a state in which the guide protrusion is inserted into the guide groove.

12. The electromechanical brake of claim 10, wherein a cylindrical enlarged portion enlarged in the radial direction is formed at a rear end portion of the guide member, the enlarged portion of the guide member is fixed to the inner surface of a cylinder of the caliper housing, and a front portion of the enlarged portion of the guide member is inserted into the hollow portion of the piston and coupled to an outer surface of the nut member.

13. The electromechanical brake of claim 12, wherein the torsion spring is installed between the enlarged portion of the guide member and the friction member.

\* \* \* \* \*